United States Patent
Ha et al.

(10) Patent No.: US 9,397,590 B2
(45) Date of Patent: **\*Jul. 19, 2016**

(54) DOUBLE WOUND ROTOR TYPE MOTOR WITH CONSTANT ALTERNATING CURRENT OR DIRECT CURRENT POWER SUPPLY INPUT AND CONTROL METHOD THEREOF

(71) Applicant: SNU R&DB FOUNDATION, Seoul (KR)

(72) Inventors: Jung Ik Ha, Seoul (KR); Yong Su Han, Daejeon (KR)

(73) Assignee: SNU R&DB Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/397,646

(22) PCT Filed: Apr. 5, 2013

(86) PCT No.: PCT/KR2013/002857
§ 371 (c)(1),
(2) Date: Oct. 28, 2014

(87) PCT Pub. No.: WO2013/165100
PCT Pub. Date: Nov. 7, 2013

(65) Prior Publication Data
US 2015/0145466 A1    May 28, 2015

(30) Foreign Application Priority Data

Apr. 30, 2012 (KR) .................. 10-2012-0045352

(51) Int. Cl.
*H02P 1/24* (2006.01)
*H02P 1/42* (2006.01)
(Continued)

(52) U.S. Cl.
CPC .. *H02P 1/42* (2013.01); *H02P 4/00* (2013.01); *H02P 25/04* (2013.01); *H02P 25/26* (2013.01)

(58) Field of Classification Search
CPC ... H02M 7/129; H02M 7/53871; H02P 27/06; H02P 1/42; H02J 7/0072
See application file for complete search history.

(56) References Cited

U.S. PATENT DOCUMENTS

| 4,443,748 A * | 4/1984 | Boev ........................ H02P 3/22 318/732 |
| 2003/0071596 A1* | 4/2003 | Gokhale .............. H02P 21/005 318/727 |

FOREIGN PATENT DOCUMENTS

| JP | 2001-245462 A | 9/2001 |
| JP | 2004-153940 A | 5/2004 |

(Continued)

OTHER PUBLICATIONS

PCT International Search Report and Written Opinion, PCT/KR2013/002857, Jun. 27, 2013, 8 Pages.

(Continued)

*Primary Examiner* — Karen Masih
(74) *Attorney, Agent, or Firm* — Fenwick & West LLP

(57) ABSTRACT

A double wound rotor type motor with a constant alternating current or direct current power supply input and a control method thereof is disclosed. The wound rotor type motor includes: a stator in which a coil directly connected to a single phase grid power supply or a direct current power supply is wound; a rotor that is rotatably supported in the stator; a power conversion device that is attached to the rotor and controls a rotor current without connection of a separate external power supply; and a control circuit that is connected to the power conversion device and controls the power conversion device.

20 Claims, 14 Drawing Sheets

(51) Int. Cl.
*H02P 25/26* (2006.01)
*H02P 4/00* (2006.01)
*H02P 25/04* (2006.01)

(56) References Cited

FOREIGN PATENT DOCUMENTS

| JP | 2005-094840 A | 4/2005 |
|---|---|---|
| JP | 4912516 B2 | 1/2012 |
| KR | 10-2005-0085204 A | 8/2005 |
| WO | WO 01/02139 A1 | 1/2001 |
| WO | WO 2004/051836 A1 | 6/2004 |
| WO | WO 2011/070651 A1 | 6/2011 |

OTHER PUBLICATIONS

Jung, Eunsoo, et al., "Brushless Synchronous Motor with Inverter Integrated Rotor," KIEE Summer Annual Conference, 2011, pp. 1143-1144.

* cited by examiner

DOUBLE WOUND ROTOR TYPE MOTOR WITH CONSTANT ALTERNATING CURRENT OR DIRECT CURRENT POWER SUPPLY INPUT AND CONTROL METHOD THEREOF

TECHNICAL FIELD

The present disclosure relates to a wound rotor type motor, and more particularly, to a single phase wound rotor type motor with a constant alternating current or direct current power supply input and a control method thereof.

BACKGROUND ART

In a driving system of a single phase induction motor of the related art, a single phase power supply is directly connected to an induction motor. FIG. 1a shows the driving system of the single phase induction motor (a squirrel cage type induction motor) of the related art, which is called a direct input moving driving system. FIG. 1b and FIG. 1c shows graphs illustrating a relationship of a velocity-torque curve and a velocity-rotor current at the direct input driving time of the single phase induction motor of the related art. The vertical axis of FIG. 1b represents the output maximum torque, and the horizontal axis represents a value obtained by normalizing an electrical angle rotation velocity of a rotor by a frequency of a system voltage (Wn=Wr/We). A high output torque is represented only in the vicinity of the frequency of a system voltage (Wn=+1, −1), and it is difficult to vary the torque at a constant velocity. Above everything else, there is no torque at a velocity of 0, and thus it is difficult to perform initial moving. That is, when the velocity of the inductor motor is 0, that is, in a situation where the inductor motor is stopped, it does not have any torque value. For this reason, there is a problem that it is difficult to perform the initial moving of the induction motor. In other words, for the initial moving of the induction motor, a separate moving circuit or a mechanical device disclosed in Korean Laid-Open Patent Publication No. 10-2005-0085204 is necessary. As a result, an induction motor driving system is complex, and a configuration thereof is inefficient. Referring to FIG. 1c, at a velocity in the vicinity of the frequency of a system voltage, that is, except for a low slip section, it can be confirmed that a rotor current deviates from a rated current. That is, a driving area is very restricted. When deviating from the rated current, it is also difficult to control the velocity of the motor. In the direct input moving driving system control, the moving velocity is only determined according to the magnitude of load, and a power factor of a single phase grid is not also secured.

DISCLOSURE OF INVENTION

Technical Problem

According to an aspect of the disclosure, it is possible to embody a single phase induction motor without a separate circuit for initial driving.

In addition, it is possible to embody a single phase induction motor satisfying a current condition in all velocity sections and having a wide driving area.

In addition, it is possible to minimize a power conversion device necessary to perform variable velocity driving of the single phase induction motor. In other words, it is possible to control a rotor current without connection of an external power supply.

In addition, although the single phase induction motor is directly connected to a system power supply, it is possible to perform the variable velocity control.

Furthermore, it is possible to keep a harmonic rate of the system power supply very low. Moreover, it is possible to control a power factor of a system power supply.

Solution to Problem

According to an aspect of the disclosure, there is provided a wound rotor type motor including: a stator in which a coil directly connected to a single phase grid power supply or a direct current power supply is wound; a rotor that is rotatably supported in the stator; a power conversion device that is attached to the rotor and controls a rotor current without connection of a separate external power supply; and a control circuit that is connected to the power conversion device and controls the power conversion device.

According to another aspect of the disclosure, there is provided a wound rotor type motor including: a stator in which a coil directly connected to a single phase grid power supply or a direct current power supply is wound; a rotor that is rotatably supported in the stator; a contactor that is attached to a rotor shaft to allow a current to flow in the rotor from the outside; a power conversion device that is connected to the rotor through the contactor on the outside of the rotor, and controls a rotor current without connection of a separate external power supply; and a control circuit that is connected to the power conversion device, and controls the power conversion device.

In the wound rotor type motor, the power conversion device may be an inverter using a power element.

In the wound rotor type motor, the power conversion device may be connected to a load, and an insulating form voltage may be transmitted to the load.

In the wound rotor type motor, the control circuit may model and control the single phase grid power supply or direct current power supply into a positive phase sequence component and negative phase sequence component 3-phase voltage.

In the wound rotor type motor, the control circuit may include: a velocity controller that generates a torque reference necessary to drive the induction motor; a voltage controller that generates a power reference of the rotor; a current reference generator that generates a rotor current reference on the basis of the generated power reference of the rotor; and a current controller that generates a voltage reference on the basis of the generated rotor current reference, a DC-Link voltage of the power conversion device, or the rotor current, wherein the power conversion device may apply a voltage to the rotor on the basis of the generated voltage reference to control the rotor current.

In the wound rotor type motor, the control circuit may further include a velocity controller that generates a torque reference necessary to drive the induction motor, and the current controller may generate the rotor current reference on the basis of the generated power reference of the rotor or the generated torque reference.

In the wound rotor type motor, the control circuit may further include a reactive power reference generator that generates a reactive power reference of a stator, and the current reference generator may generate the rotor current reference on the basis of the generated power reference of the rotor, the generated torque reference, or the reactive power reference of the stator.

In the wound rotor type motor, the velocity controller may generate the torque reference on the basis of a mechanical angular velocity of the rotor.

In the wound rotor type motor, the reactive power reference generator may generate the reactive power reference of the stator on the basis of the rotor current.

In the wound rotor type motor, the rotor current reference may include a d-axis current reference and a q-axis current reference, and the current reference generator may generate the d-axis current reference on the basis of the generated reactive power reference.

In the wound rotor type motor, the current reference generator may generate the q-axis current reference on the basis of the generated power reference of the rotor and the d-axis current reference.

In the wound rotor type motor, the current reference generator may generate the q-axis current reference on the basis of the generated torque reference and the d-axis current reference.

In the wound rotor type motor, the current reference generator may generate the q-axis current reference on the basis of the generated power reference of the rotor, the generated torque reference, and the d-axis current reference.

According to still another aspect of the disclosure, there is provided a control method of a wound rotor type motor including: generating a torque reference necessary to drive the wound rotor type motor including a stator in which a coil directly connected to a single phase grid power supply or a direct current power supply is wound, a rotor that is rotatably supported in the stator, a power conversion device that is attached to the rotor and controls a rotor current without connection of a separate external power supply, and a control circuit that is connected to the power conversion device and controls the power conversion device; generating a power reference of the rotor; generating a rotor current reference on the basis of the generated power reference of the rotor; and generating a voltage reference on the basis of the generated rotor current reference, a DC-Link voltage of the power conversion device, or the rotor current, wherein the power conversion device applies a voltage to the rotor on the basis of the generated power reference to control the rotor current.

The control method of a wound rotor type motor may further include generating a torque reference necessary to drive the induction motor, wherein the generating of the rotor current reference may further include generating the rotor current reference on the basis of the generated power reference of the rotor or the generated torque reference.

The control method of a wound rotor type motor may further include generating a reactive power reference of the stator, wherein the generating of the rotor current reference may further include generating the rotor current reference on the basis of the generated power reference of the rotor, the generated torque reference, or the reactive power reference of the stator.

In the control method of a wound rotor type motor, the rotor current reference may include a d-axis current reference and a q-axis current reference, and the generating of the rotor current reference may further include generating the d-axis current reference on the basis of the generated reactive power reference.

In the control method of a wound rotor type motor, the generating of the rotor current reference may further include generating the q-axis current reference on the basis of the generated power reference of the rotor, the generated torque reference, and the d-axis current reference.

Advantageous Effects of Invention

According to the aspect of the disclosure, an effect capable of removing a separate circuit for initial moving of a single phase wound rotor type motor is achieved.

In addition, an effect capable of driving the single phase wound rotor motor in all the velocity sections in the rated current is achieved.

In addition, an effect capable of minimizing a power conversion circuit in a driving system of the single phase wound rotor type motor is achieved.

In addition, an effect of smoothing the variable velocity control is achieved although the single phase wound rotor type motor is directly connected to the system power supply.

In addition, an effect capable of lowering a harmonic rate of various system power supplies including three phases is achieved.

In addition, an effect capable of adjusting a power factor of a power supply connected to a wound rotor type induction motor is achieved.

BRIEF DESCRIPTION OF DRAWINGS

The above and other aspects, features and advantages of the disclosed exemplary embodiments will be more apparent from the following detailed description taken in conjunction with the accompanying drawings in which.

MODE FOR THE INVENTION

Figure 1A:
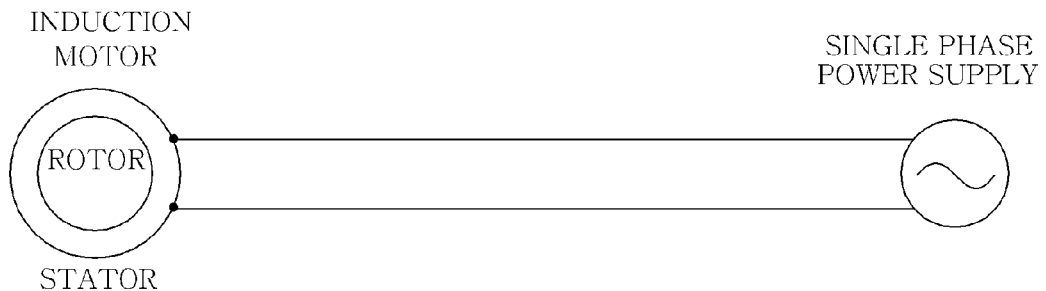
FIG. 1a is a diagram illustrating a direct input moving driving system of a single phase induction motor of the related art.

The detailed description about the disclosure to be described later is performed with reference to the accompanying drawings showing specific embodiments as an example for embodying the disclosure. The embodiments will be described in detail sufficiently for a person skilled in the art to embodying the disclosure. Various embodiments of the disclosure are different from one another, but it should be understood that they are not necessary to mutually exclusive. For example, specific shapes, structures, and characteristics described herein may be embodied by different embodiments without deviating from the sprit and scope of the disclosure concerning an embodiment. In addition, it should be understood that positions and disposition of individual constituent elements in the described embodiments may be modified without deviating from the sprit and scope of the disclosure. Accordingly, the detailed description to be described later are not taken as limitative meanings, and the scope of the disclosure is limited only by claims accompanying with all the scopes equivalent to what is claimed when it is appropriately described. In the drawings, similar reference numerals and signs indicate the same or similar functions throughout various aspects.

Figure 2A:
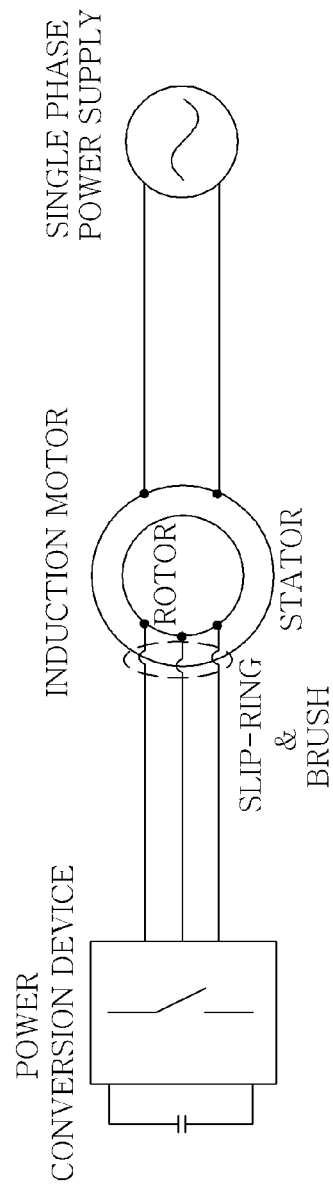
FIG. 2a is a diagram illustrating a single phase wound rotor type motor driving system according to an embodiment of the disclosure.
Figure 2B:
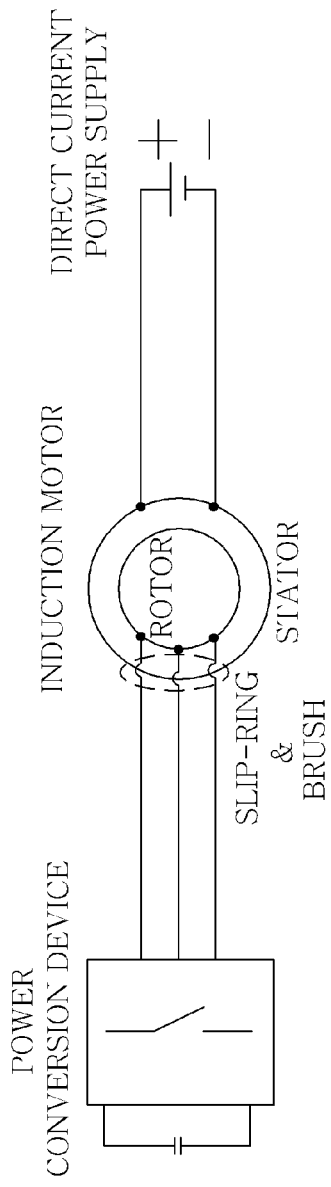
FIG. 2b is diagram illustrating a wound rotor type motor driving system using a direct current power supply according to an embodiment of the disclosure.

FIG. 2a is a diagram illustrating a single phase induction motor driving system according to an embodiment of the disclosure. The embodiment of the disclosure discloses a single phase wound rotor type motor driving system in which a harmonic rate of a system power supply is minimized while minimizing a power conversion device necessary to driving the single phase induction motor at a variable velocity. In the embodiment, the wound rotor type motor driving system is described mainly on the basis of a single phase grid power supply, but it is obvious that the wound rotor type motor driving system according to an embodiment of the disclosure is applicable to a direct current power supply as shown in FIG. 2b.

The power conversion device shown in FIG. 2a is connected to a rotor and plays a role of controlling a current of the rotor. To drive the power conversion device, energy has to be supplied. The single phase grid power supply of the disclosure is connected only to a stator coil, a separate external power supply is not connected, and thus power of the power conversion device connected to the rotor has to be adjusted by adjusting power transmitted to the rotor through a stator. It is possible to perform the variable velocity control and power factor control through such an appropriate control of the power conversion device although the single phase induction motor is directly connected to the single phase grid power supply, and it is possible to keep the harmonic rate of the system power supply very low. In the structure shown in FIG. 2a, since the power conversion device connected to the rotor is present on the outside of the single phase wound rotor type motor, a slip-ring and a brush structure may be necessary. The slip-ring is a contactor that is attached to the rotor shaft to allow a current to flow in the rotor of a motor or an engine from the outside, and the brush is a contractor that is fixed to the outside to connect the slip-ring to the external circuit.

Figure 1B:
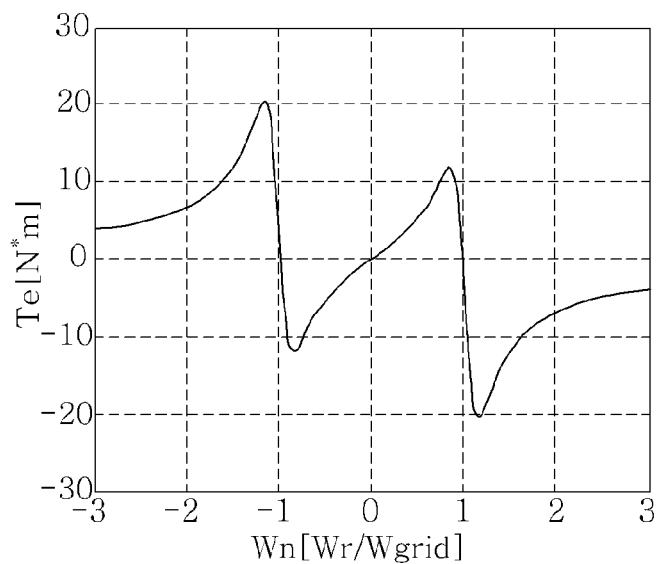
FIG. 1b is a graph illustrating a relationship of a rotor velocity-torque curve at the direct input driving time of a single phase squirrel cage type induction motor of the related art.
Figure 1C:
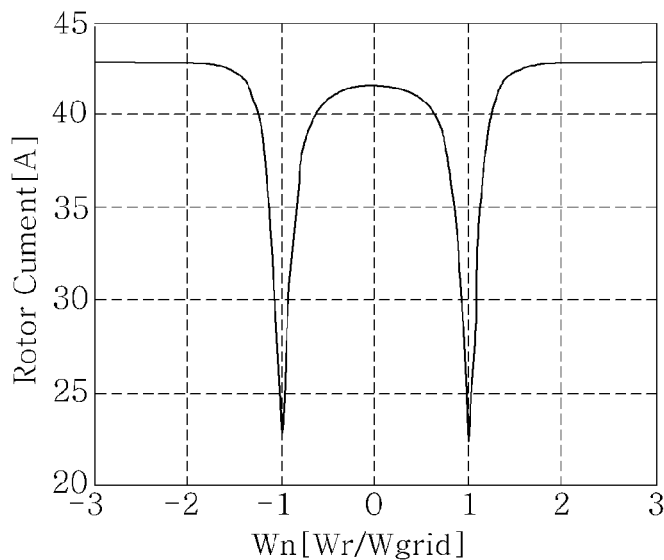
FIG. 1c is a graph illustrating a relationship of a rotor velocity-rotor current amount at the direct input driving time of the single phase squirrel cage type induction motor of the related art.
Figure 2C:
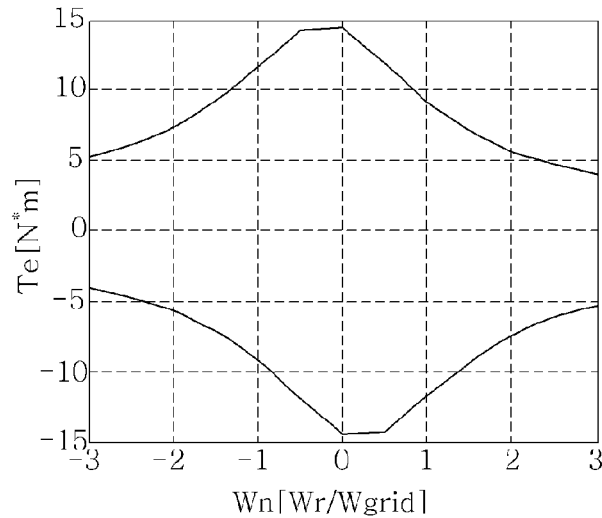
FIG. 2c is graph illustrating a relationship of a rotor velocity-torque curve at the time of driving the single phase wound rotor type motor according to an embodiment of the disclosure.

FIG. 2c is a graph illustrating a relationship of a rotor velocity-torque curve at the time of driving the wound rotor type motor according to an embodiment of the disclosure. A high torque is represented in the whole velocity area as compared with FIG. 1b illustrating the relationship of the velocity-torque curve of the signal phase squirrel cage type induction motor of the related art, it is possible to perform driving within the rated current, and thus it is possible to perform continuous driving in all the velocity sections. In addition, it is possible to perform two-way torque control, and the torque may be variable.

Figure 3:
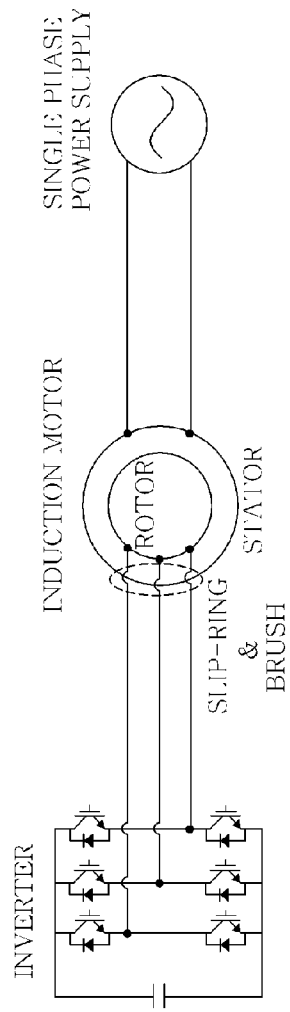
FIG. 3 is a diagram illustrating a single phase wound rotor type motor driving system using a PWM inverter according to an embodiment of the disclosure.

FIG. 3 is a diagram illustrating a single phase wound rotor type motor driving system using a PWM inverter according to an embodiment of the disclosure. The PWM inverter connected to the rotor may be both of a single phase inverter and a multi-phase inverter, and may be a multi-level inverter irrespective of the number of levels. Generally, embodying of the inverter is configured by connecting an IGBT element to a reverse parallel diode, but is not limited to the power elements.

Figure 4:
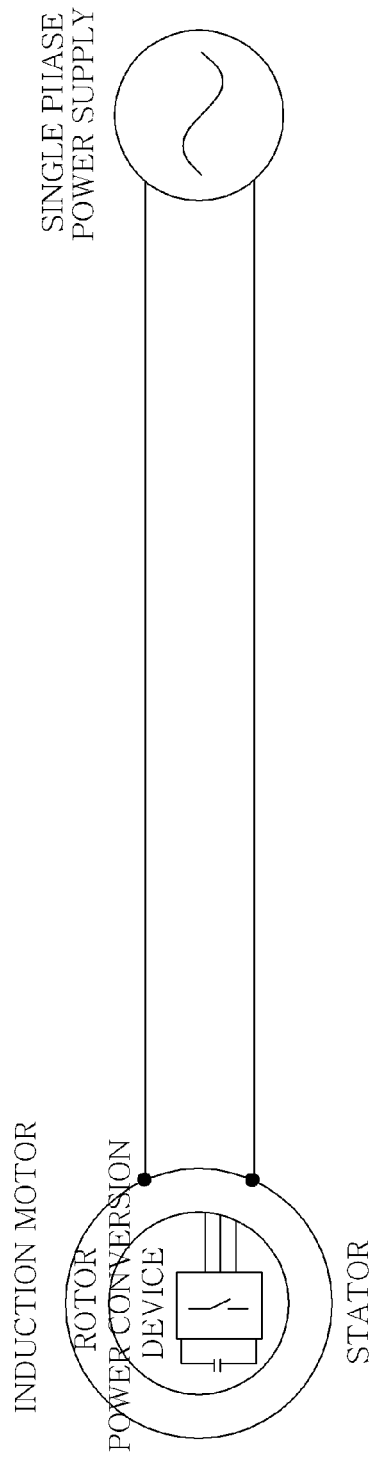
FIG. 4 is a diagram illustrating a rotor lead-in type single phase wound rotor type motor driving system according to an embodiment of the disclosure.

FIG. 4 is a diagram illustrating a rotor lead-in type single phase induction motor driving system according to an embodiment of the disclosure. The system of FIG. 4 shows a different structure of the single phase induction motor driving system of FIG. 2. Since the power conversion device connected to the rotor is present on the outside of the wound rotor type motor, the power conversion device may be attached to the rotor to remove the necessary slip-ring and brush. It is a structure possible because the power conversion device connected to the rotor is not connected to an external additional power supply source, the slip-ring is removed thereby, and thus it is possible to embody a smaller and inexpensive wound rotor type motor driving system. As viewed from the outside, since the single phase grid power supply is directly connected to the stator of the single phase wound rotor type motor, it is the same as the structure of the direct input moving of the single phase squirrel cage type induction motor. However, it is possible to perform the variable velocity control, the torque control, and the power factor control of the wound rotor type motor through the power conversion device of the rotor, and it is possible to keep the harmonic rate of the system power supply low.

Figure 5:
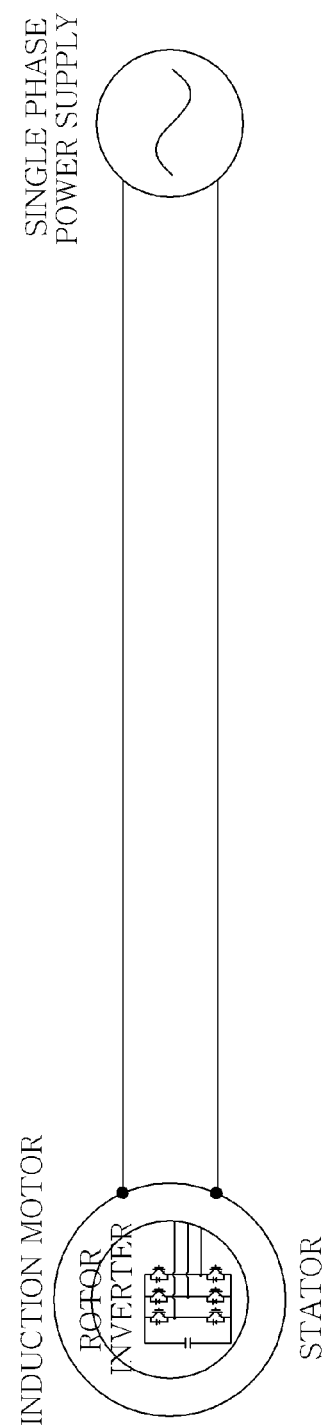
FIG. 5 is diagram illustrating a single phase wound rotor type motor driving system using a PWM inverter according to an embodiment of the disclosure.

FIG. 5 is a diagram illustrating a rotor lead-in type single phase wound rotor type motor driving system using a PWM inverter according to an embodiment of the disclosure. The PWM inverter connected to the rotor may be both of a single phase inverter and a multi-phase inverter, and may be a multi-level inverter irrespective of the number of levels. Generally, embodying of the inverter is configured by connecting an IGBT element to a reverse parallel diode.

Figure 6A:
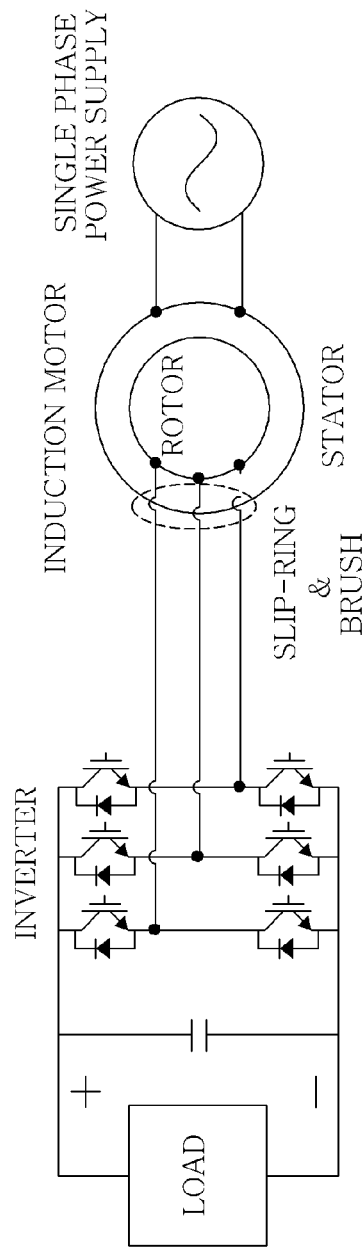
FIG. 6a is a diagram illustrating a single phase wound rotor type motor driving system connected to a load according to an embodiment of the disclosure.
Figure 6B:
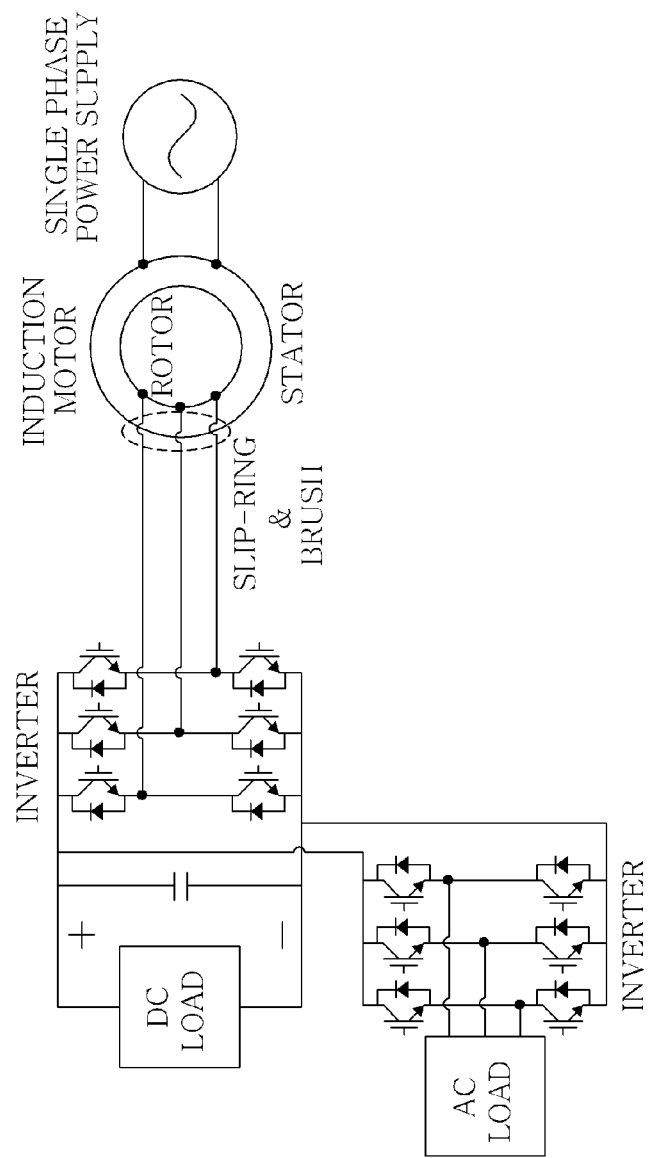
FIG. 6b is a diagram illustrating a rotor lead-in type single phase wound rotor type motor driving system connected to DC and AC loads according to an embodiment of the disclosure.

FIG. 6 is a diagram illustrating a single phase wound rotor type motor driving system connected to a load according to an embodiment of the disclosure. As shown in FIG. 6a, a power conversion circuit DC-Link may be connected to an arbitrary load. In this case, an insulating power is supplied to the load. In such a power described above, a form of connecting an AC load is possible by applying an additional inverter in addition to the connection of the direct DC load to the DC-Link as shown in FIG. 6b, and the voltage may be supplied to the load in a form of insulating from the power supply.

Figure 7A:
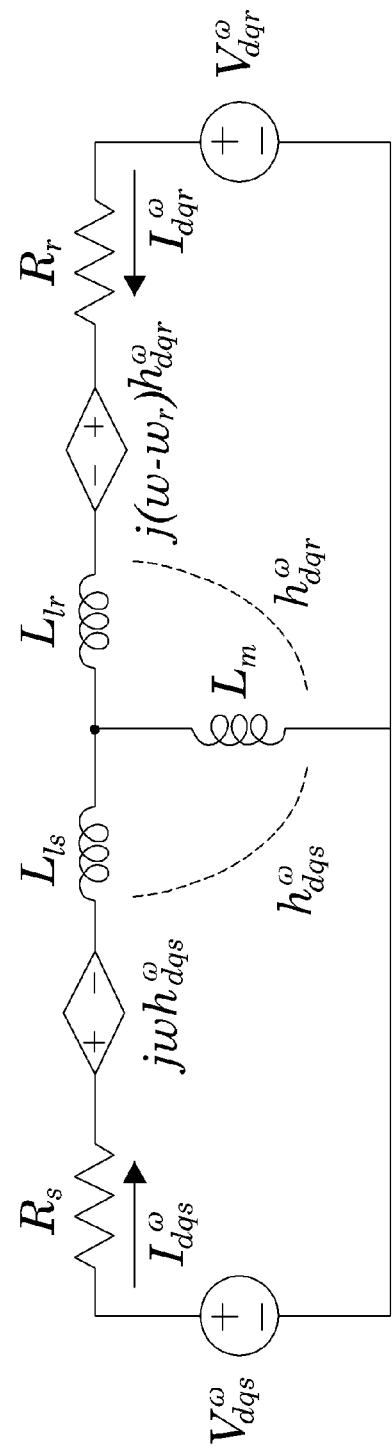
FIG. 7a is a diagram illustrating an equivalent model of a general induction motor.
Figure 7B:
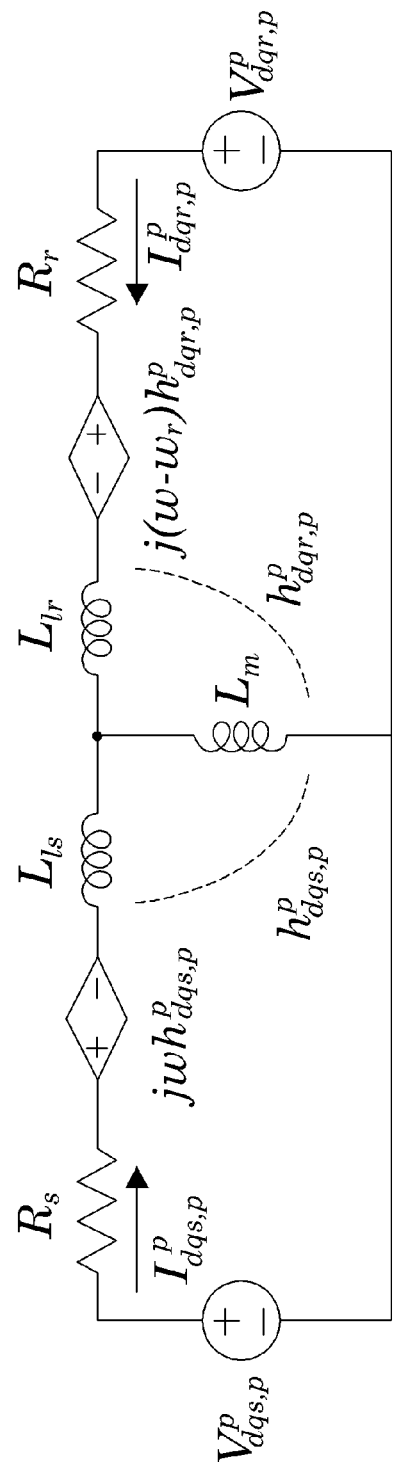
FIG. 7b is a diagram illustrating a positive phase sequence component equivalent model of a single phase wound rotor type motor according to an embodiment of the disclosure.
Figure 7C:
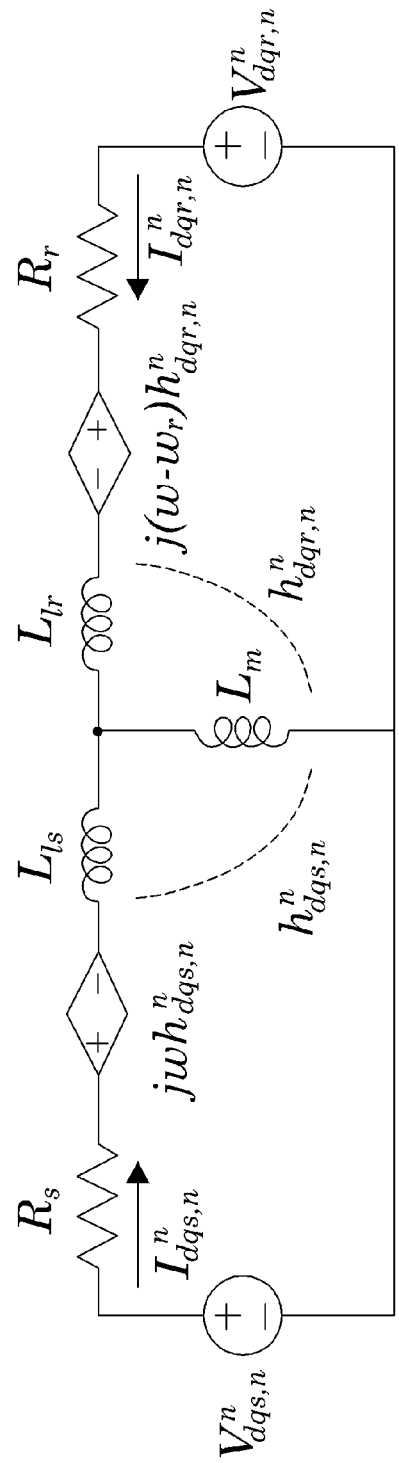
FIG. 7c is a diagram illustrating a negative phase sequence component equivalent model of a single phase wound rotor type motor according to an embodiment of the disclosure.

FIG. 7a is a diagram illustrating an equivalent model of a general 3-phase induction motor. The equivalent model shown in FIG. 7a may apply even to the single phase induction motor or the single phase wound rotor type motor. FIG. 7b is a diagram illustrating an equivalent model to which a 3-phase power of the positive phase sequence component of the single phase wound rotor type motor according to an embodiment of the disclosure is applied, and FIG. 7c is a diagram illustrating an equivalent model to which a 3-phase power of the negative phase sequence component of the single phase induction motor according to an embodiment of the disclosure is applied. In the single phase wound rotor type motor according to an embodiment of the disclosure, it is possible to model FIGS. 7b and 7c using a phenomenon of superposition.

The stator of the single phase wound rotor type motor according to an embodiment of the disclosure is connected to an alternating current power supply or a direct current power supply of the single phase grid, and the rotor is connected to a variable power supply to control the current. Targets to be controlled by the power conversion device connected to the rotor in the structure are two kinds. The first is an instant torque necessary to driving the motor, and the second is power flowing through the power conversion device connected to the rotor. The equivalent models shown in FIG. 7a, FIG. 7b, and FIG. 7c for a modeling method for the instant torque control and power control are considered.

That is, in the connection of the signal phase power supply or the direct current power supply to the stator coil of the induction motor, it is possible to perform modeling by the sum of the positive phase sequence component and the negative phase sequence component having the same magnitude. This is modeling of magnetic flux fluctuating based on the single phase power supply by two rotating magnetic flux. The same phenomenon may be also applied to the direct current power supply as described above. Accordingly, it may be assumed that the voltage applied to the stator coil is the same as Equation 1.

$$V_s = -E \sin(\theta_{grid}) \quad \text{[Equation 1]}$$

Herein, modeling may be performed in a form of positive phase sequence component 3-phase voltage of Equation 2 and negative phase sequence component 3-phase voltage of Equation 3 as follows, such that the sum of magnetic flux based on the rotating positive phase sequence component 3-phase voltage and negative phase sequence component 3-phase voltage is the same as the magnetic flux formed by the single phase voltage.

$$V_{as,p} = -\frac{E}{3}\sin(\theta_{grid})$$

$$V_{bs,p} = -\frac{E}{3}\sin\left(\theta_{grid} - \frac{2}{3}\pi\right) \quad \text{[Equation 2]}$$

$$V_{cs,p} = -\frac{E}{3}\sin\left(\theta_{grid} + \frac{2}{3}\pi\right)$$

$$V_{as,n} = -\frac{E}{3}\sin(\theta_{grid})$$

$$V_{bs,n} = -\frac{E}{3}\sin\left(\theta_{grid} + \frac{2}{3}\pi\right) \quad \text{[Equation 3]}$$

$$V_{cs,n} = -\frac{E}{3}\sin\left(\theta_{grid} - \frac{2}{3}\pi\right)$$

In Equation 2 and Equation 3, a lower suffix p means a positive phase sequence component (positive), and a lower suffix n means a negative phase sequence component (negative). Accordingly, the single phase induction motor may be controlled by a method of being applied to two doubly-fed wound rotor type motors in which the positive phase sequence component and negative sequence component 3-phase voltages are applied to the induction motor stator coil. However, there are current and magnetic flux based on each voltage, and thus a control method of independently controlling them is necessary.

First, it is possible to know a control method of an instant torque of the wound rotor type motor through the equivalent models of the induction motor of FIG. 7a, FIG. 7b, and FIG. 7c. In each equivalent model, total 4 power supplies are present, each of the system power supply connected to the stator and the rotor power supply generated by the power conversion device connected to the rotor is an independent power supply, and the power supplies generated according to the driving state of the rotor are two dependent power supplies. The independent power supplies connected to the stator are the fixed power supply connected to the single phase grid power supply, are reversely rotated, and are two fixed 3-phase voltages with the same magnitude. The dependent power supplies equivalently generated in the rotor are determined according to the driving condition of the induction motor and the set coordinate system. The dependent power supplies equivalently generated in the stator are determined according to the set coordinate system. Accordingly, the dependent power supply on the rotor side is changed according to the motor driving condition, but the dependent power supply on the stator side is not changed when a frequency of the set coordinate system is constant. In the present system, the fixed power supply is connected to the stator, and the frequency of the set coordinate system is not changed when the stator magnetic flux system is applied, and thus the dependent power supply on the stator side has a constant value. This is applied to both of the positive phase sequence component and negative phase sequence component equivalent circuits shown in FIG. 7b and FIG. 7c. However, signs of the frequencies are represented differently from each other due to the difference in voltage direction between the positive phase sequence component and the negative phase sequence component. In FIGS. 7b and 7c, the frequency of the positive phase sequence component is represented and applied by $w_p$, the frequency of the negative phase sequence component is represented and applied by $w_n$, $w_p$ is rotated in the same direction as the voltage coordinate system of the single phase power supply of Equation 1, and $w_n$ is rotated in the reverse direction to the voltage coordinate system of the single phase power supply. That is, signs thereof are different. However, the fixed coordinate system is applied to both of the positive phase sequence component and the negative phase sequence component, and thus the rotor current considering the dependent power supply on the rotor side according to the driving condition is controlled by varying the rotor power supply considering the dependent power supply of the rotor according to the driving condition. Accordingly, each current controller for controlling the positive phase sequence component and the negative phase sequence component is set, and the output of the current controller is represented by the rotor voltage reference of each of the positive sequence component and the negative phase sequence component. The sum of two voltage references is applied to the power conversion device connected to the rotor, and the voltages are synthesized. In this case, a superposition principle of dividing and analyzing the system to which one single phase power supply is applied, into two circuits, is applied. The rotor current controlled in such a manner induces the stator current to generate the torque of the motor.

In the 3-phase alternating current motor, when the current flows in the stator coil of each phase, a current vector of each phase is defined corresponding to a magnetic flux vector determined by a position of the coil of each phase and a current instant value. A control of taking a direction of a main magnetic flux vector (a rotor magnetic vector of a frequency w) formed by synthesizing the magnetic flux vector of each phase as a d axis, taking a direction perpendicular thereto as a q axis, and dividing the current vector formed by synthesizing the current vector of each phase into components on the dq-axis coordinates rotated synthesizing with the main magnetic flux vector, is called a vector control of an alternating current motor. The dq-axis coordinate system is rotated by synchronization with the main magnetic flux vector, and thus each component is normally a direct current amount. The d-axis current (the magnetic flux current) that is the component in the magnetic flux direction in the current vectors controls the magnetic flux, and the q-axis current (the torque current) that is the component perpendicular to the magnetic flux controls the torque. In the direct current motor, these are controlled by a field current, and an armature current. In the specification, physical quantity such as current, voltage, and magnetic flux are defined in the d-axis and q-axis direction, d and q are expressed by lower suffix.

The following Equation 4 is stator and rotor voltage equations of the induction motor expressing FIG. 7a in a general arbitrary w reference rotation coordinate system. It is induced by Kirchhoff's voltage law and Ohm s law. Equation 5 represents the stator and rotor voltage magnetic flux in this case, and Equation 6 represents an equation of an instant torque generated in this case.

$$v_{ds}^\omega = R_s i_{ds}^\omega + \frac{d}{dt}\lambda_{ds}^\omega - \omega\lambda_{qs}^\omega \quad \text{[Equation 4]}$$

$$v_{qs}^\omega = R_s i_{qs}^\omega + \frac{d}{dt}\lambda_{qs}^\omega + \omega\lambda_{ds}^\omega$$

$$v_{dr}^\omega = R_r i_{dr}^\omega + \frac{d}{dt}\lambda_{dr}^\omega - (\omega - \omega_r)\lambda_{qr}^\omega$$

$$v_{qr}^\omega = R_r i_{qr}^\omega + \frac{d}{dt}\lambda_{qr}^\omega + (\omega - \omega_r)\lambda_{dr}^\omega$$

$$\lambda_{ds}^\omega = L_s i_{ds}^\omega + L_m i_{dr}^\omega \quad \text{[Equation 5]}$$

$$\lambda_{qs}^\omega = L_s i_{qs}^\omega + L_m i_{qr}^\omega$$

$$\lambda_{dr}^\omega = L_m i_{ds}^\omega + L_r i_{dr}^\omega$$

$$\lambda_{qr}^\omega = L_m i_{qs}^\omega + L_r i_{qr}^\omega$$

$$T_e = \frac{3}{2}\frac{P}{2}(\lambda_{qr}^\omega i_{dr}^\omega - \lambda_{dr}^\omega i_{qr}^\omega) \quad \text{[Equation 6]}$$

When it is possible to control the rotor current, it is possible to calculate the rotor voltage and the stator current based on the slip condition at that time using Equation 4 to Equation 6, and it is possible to calculate the magnetic flux using Equation 5. Accordingly, it is possible to calculate the instant torque.

As described above, in the proposed single phase wound rotor type motor driving system, modeling is performed by division into the 3-phase voltages of the positive phase sequence component and the negative phase sequence component. The torque is formed by combination of magnetic flux current (the d axis) and the torque current. Accordingly, at the present system in which two magnetic currents and two torque currents are present, total 4 kinds of torques are present. They are the $T_{pp}$ based on the magnetic current of the positive phase sequence component and the torque current of the positive phase sequence component, $T_{pn}$ based on the magnetic current of the positive phase sequence component and the torque current of the negative phase sequence component, $T_{np}$ based on the torque current of the positive phase sequence component and the magnetic current of the negative phase sequence component, and $T_{nn}$ based on the magnetic current of the negative phase sequence component and the torque current of the negative phase sequence component.

Herein, the lower suffix p means the synchronization coordinate system of the positive phase sequence component magnetic flux, and the lower suffix n means the synchronization coordinate system of the negative phase sequence component magnetic flux.

$T_{pp}$, $T_{nn}$, $T_{pn}$, and $T_{pp}$ are as shown in Equation 7.

$$T_{e,pp} = \frac{3}{2}\frac{P}{2}\frac{L_m}{L_s}(\lambda_{qs,p}^\omega I_{dr,p}^\omega - \lambda_{ds,p}^\omega I_{qr,p}^\omega) = \frac{3}{2}\frac{P}{2}\frac{L_m}{L_s}\frac{E}{3\omega_{grid}}(-I_{qr,p}^p) \quad \text{[Equation 7]}$$

$$T_{e,nn} = \frac{3}{2}\frac{P}{2}\frac{L_m}{L_s}(\lambda_{qs,n}^\omega I_{dr,n}^\omega - \lambda_{ds,n}^\omega I_{qr,n}^\omega) = \frac{3}{2}\frac{P}{2}\frac{L_m}{L_s}\frac{E}{3\omega_{grid}}(-I_{qr,n}^n)$$

$$T_{e,pn} = \frac{3}{2}\frac{P}{2}\frac{L_m}{L_s}(\lambda_{qs,p}^\omega I_{dr,n}^\omega - \lambda_{ds,p}^\omega I_{qr,n}^\omega) = \frac{3}{2}\frac{P}{2}\frac{L_m}{L_s}\lambda_{ds,p}^p(I_{dr,n}^n\sin(2\theta_{grid}) - I_{qr,n}^n\cos(2\theta_{grid}))$$

$$T_{e,np} = \frac{3}{2}\frac{P}{2}\frac{L_m}{L_s}(\lambda_{qs,n}^\omega I_{dr,p}^\omega - \lambda_{ds,n}^\omega I_{qr,p}^\omega) = \frac{3}{2}\frac{P}{2}\frac{L_m}{L_s}\lambda_{ds,n}^n(-I_{dr,p}^p\sin(2\theta_{grid}) - I_{qr,p}^n\cos(2\theta_{grid}))$$

$T_{pn}$ and $T_{np}$ are present as a ripple torque in a form configured by multiplication of a constant and a trigonometrical function, and an effective value is 0. Accordingly, $T_{pp}$ and $T_{nn}$ in which the effective values are present are items having an influence on the velocity control, and the effective torque is determined by the sum of $T_{pp}$ and $T_{nn}$ as shown in Equation 8.

$$T_e = T_{e,pp} + T_{e,nn} \quad \text{[Equation 8]}$$

In the synchronization coordinate system of the positive phase sequence component magnetic flux and the synchronization coordinate system of the negative phase sequence component magnetic flux, the d-axis magnetic flux is determined by the phase voltage magnitude of the 3-phase voltage connected to the stator coil and the frequency of the power supply as shown in Equation 9.

$$\lambda_{ds,p}^p = \frac{E}{3\omega_{grid}}, \lambda_{ds,n}^n = \frac{E}{3\omega_{grid}} \quad \text{[Equation 9]}$$

On the basis of Equation 9, $T_{pp}$ and $T_{nn}$ shown in Equation 7 may be modified as shown in Equation 10.

$$T_{e,pp} =$$ [Equation 10]

$$\frac{3}{2}\frac{P}{2}\frac{L_m}{L_s}(\lambda^\omega_{qs,p}I^\omega_{dr,p} - \lambda^\omega_{ds,p}I^\omega_{qr,p}) = \frac{3}{2}\frac{P}{2}\frac{L_m}{L_s}\frac{E}{3\omega_{grid}}(-I^p_{qr,p})$$

$$T_{e,nn} = \frac{3}{2}\frac{P}{2}\frac{L_m}{L_s}(\lambda^\omega_{qs,n}I^\omega_{dr,n} - \lambda^\omega_{ds,n}I^\omega_{qr,n}) =$$

$$\frac{3}{2}\frac{P}{2}\frac{L_m}{L_s}\frac{E}{3\omega_{grid}}(-I^n_{qr,n})$$

On the basis thereof, the effective torque $T_e$ is determined as shown in Equation 11.

$$T_e = -\frac{3}{2}\frac{P}{2}\frac{L_m}{L_s}\frac{E}{3\omega_{grid}}(I^p_{qr,p} + I^n_{qr,n})$$ [Equation 11]

Accordingly, it is possible to control the torque by the sum of the positive phase sequence component and negative phase sequence component currents.

Second, it is the power control of the rotor power conversion device. The rotor power conversion device is not connected to an external separate power supply source, and thus the voltage for controlling the rotor current is generated using the power transmitted from the stator to the rotor. Accordingly, the rotor current is controlled such that the power necessary to control the rotor current in the rotor is transmitted from the stator to the rotor. The power supply necessary in the rotor is a loss necessary for the operation of the power conversion device. When the power conversion device connected to the rotor is the PWM inverter using the generally used switching element as shown in FIG. 3 or FIG. 5, a power supply necessary for a switching loss, an electric connection loss, a capacitor loss of the power semiconductor, and as inverter controller, and a power necessary to drive a switch are included in the loss necessary for the operation of the power conversion device.

Figure 8:
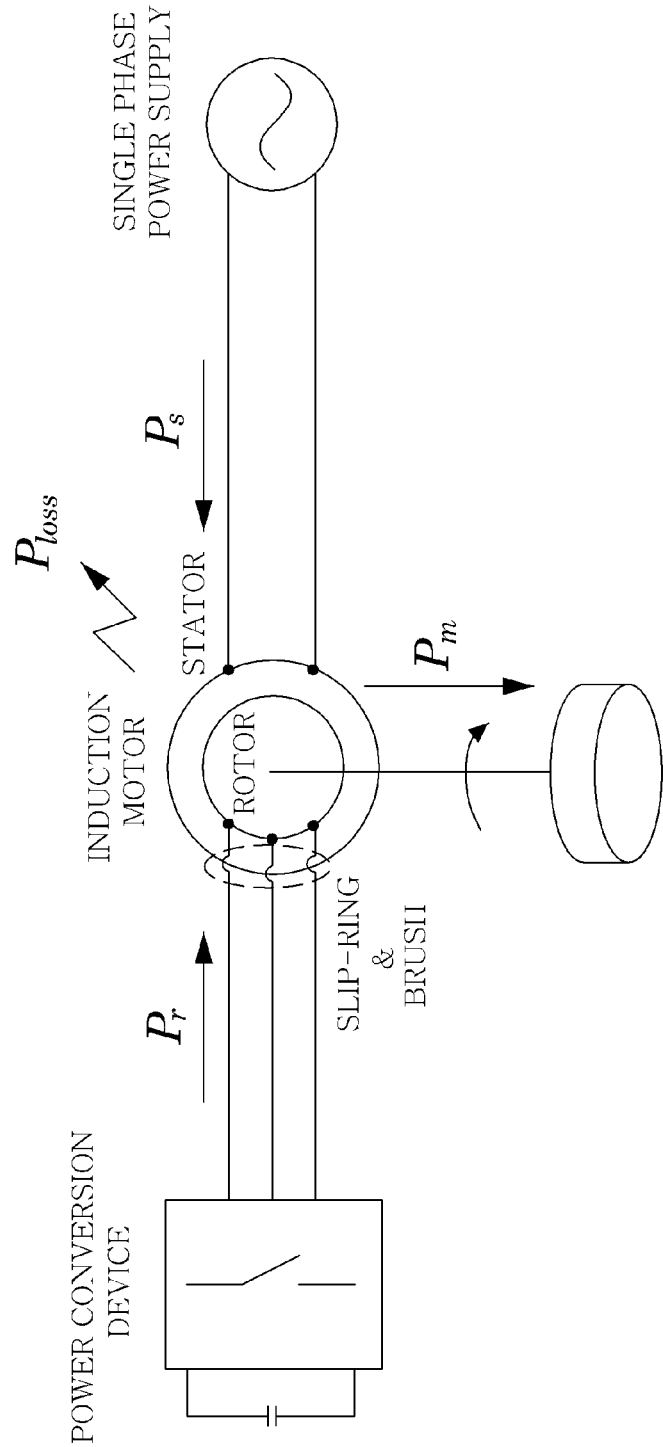
FIG. 8 is a diagram illustrating power flow of the single phase wound rotor type motor according to an embodiment of the disclosure.

FIG. 8 is a diagram illustrating power flow of the single phase power supply induction motor according to an embodiment of the disclosure. The power t from the single phase grid to the single phase wound rotor type motor is $P_s$. In FIG. 8, the power is supplied from the rotor power conversion device to the wound rotor type motor, but the rotor power conversion device is not provided with a separate external power supply. Therefore, actually, the power cannot be supplied, but the power conversion device has to receive the power necessary to control the rotor current. In addition, the DC-link voltage of the power conversion device has to be controlled, and thus the power cannot be unconditionally received from the stator. For this, the $P_r$ that is the rotor power has to be controlled to control the DC-Link voltage. The copper loss and iron loss in the motor may be represented by $P_{loss}$ including the rotor and the stator, and the mechanical output that may be the output of the induction motor is represented by $P_m$. In this case, the relational Equation of each power may be represented by Equation 12.

$$P_s + P_r + P_m + P_{loss}$$ [Equation 12]

Figure 9:
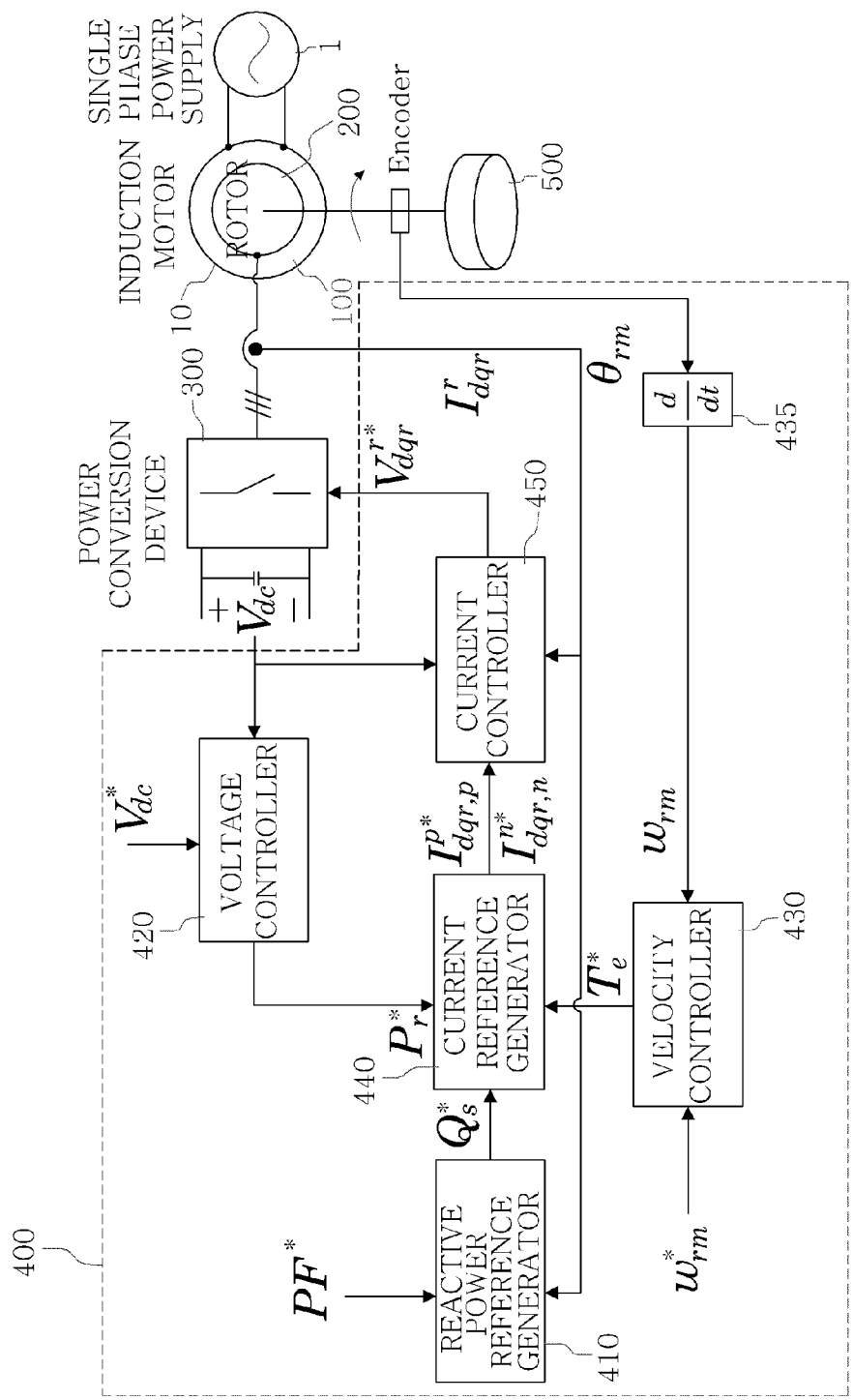
FIG. 9 is a diagram illustrating a control circuit configuration of the single phase wound rotor type motor according to an embodiment of the disclosure.

FIG. 9 is a diagram illustrating a control configuration of a single phase wound rotor type motor 10 according to an embodiment of the disclosure. The wound rotor type motor 10 may include a stator 100, a rotor 200, a power conversion device 300, and a control circuit 400. In addition, a single phase power supply 1 or a direct current power supply may be connected only to the stator 100 of the induction motor, and a load 500 may be connected thereto.

In the stator 100, a coil directly connected to the single phase power supply 1 or the direct current power supply is wound. The rotor 200 is rotatably supported in the stator. The power conversion device 300 is attached to the rotor 200, and controls the rotor current without connection of the separate external power supply. The control circuit 400 is connected to the power conversion device 300, and controls the power conversion device 300.

Specifically, the control circuit may include a reactive power reference generator 410, a voltage controller 420, a velocity controller 430, a current reference generator 440, and a current controller 450.

The reactive power reference generator 410 generates a reactive power reference ($Q_s^*$) of the stator necessary to adjust the power factor of the stator connected to the single phase power supply of the single phase induction motor. The required power factor reference (PF*) and the measured rotor current ($I_{dqr}^r$) are given as inputs. The stator power factor (PF) is estimated by the rotor current and is used as a feedback signal.

The power factor of the stator coil may be calculated by calculating the current of the stator from Equation 5 and calculating the active power and reactive power by multiplication with the given single phase grid voltage. However, in this case, only the d-axis current of the d and q-axis currents of the stator coil corresponds to the current value flowing in the single phase coil, and this may be calculated by the sum of the positive phase sequence component and the negative phase sequence component as shown in Equation 13.

$$I_{ds}^s = I_{ds,p}^s + I_{ds,n}^s$$ [Equation 13]

Herein, the upper suffix s means the stationary coordinate system. Accordingly, the sum of the d-axis currents of the positive phase sequence component and the negative phase sequence component in the fixed coordinate system becomes the current flowing in the stator coil. The voltage applied to the stator coil described above is the same as Equation 1.

When performing calculation as Equation 14 using Equation 13 and Equation 1, it is possible to calculate each of the active power ($P_s$) and the reactive power ($Q_s$) as Equation 15 and Equation 16, and it is possible to calculate the power factor (PF) on the basis thereof.

$$I_{ds}^s = I_{ds,p}^s + I_{ds,n}^s$$ [Equation 14]

$$= \cos(\theta_{grid})\left(\frac{\lambda^p_{qs,p} - L_m I^p_{dr,p}}{L_s}\right) +$$

$$\sin(\theta_{grid})\left(\frac{L_m}{L_s}I^p_{qr,p}\right) + \cos(\theta_{grid})$$

$$\left(\frac{\lambda^n_{ds,n} - L_m I^n_{dr,n}}{L_s}\right) - \sin(\theta_{grid})\left(\frac{L_m}{L_s}I^n_{qr,n}\right)$$

$$= \cos(\theta_{grid})\left(\frac{\lambda^p_{ds,p} + \lambda^n_{ds,n} - L_m(I^p_{dr,p} + I^n_{dr,n})}{L_s}\right) +$$

$$\sin(\theta_{grid})\frac{L_m}{L_s}(I^p_{qr,p} - I^n_{qr,n})$$

$$P_s = -\frac{1}{2}E\frac{L_m}{L_s}(I^p_{qr,p} - I^n_{qr,n})$$ [Equation 15]

$$Q_s = -\frac{1}{2}\left(\frac{\lambda^p_{ds,p} + \lambda^n_{ds,n} - L_m(I^p_{dr,p} + I^n_{dr,n})}{L_s}\right)E$$ [Equation 16]

$$PF = \frac{P_s}{\sqrt{P_s^2 + Q_s^2}}$$ [Equation 17]

Referring to Equation 17, the power factor (PF) is determined by a ratio of the active power ($P_s$) and the reactive power ($Q_s$) of the stator. Accordingly, by adjusting the reactive power from the active power, it is possible to adjust the power factor.

The velocity controller 430 generates the torque reference ($T_e^*$) necessary to drive the single phase induction motor 10. When the velocity reference ($W_{rm}^*$) is input, a mechanical angular velocity ($W_{rm}$) signal corresponding to a differential value of a mechanical angle of the rotor sensed by an encoder is provided as a feedback signal. Instead of the velocity controller, it is possible to arbitrarily determine a torque reference ($T_e^*$). Generally, the torque and velocity of the motor keep the relationship as Equation 18.

$$T_e = J_m \frac{d\omega_{rm}}{dt} + B\omega_{rm} \quad \text{[Equation 18]}$$

Herein, $J_m$ represents rotation inertia, and B is a friction coefficient. Generally, a term based on the friction coefficient is neglected since the magnitude thereof is small, and the second term on the right side is neglected. By adjusting the torque ($T_e$) using Equation 18, it is possible to control the velocity ($W_{rm}$) of the motor.

The voltage controller 420 generates the power reference ($P_r^*$) of the rotor on the basis of the DC-Link voltage ($V_{dc}$) of the power conversion device 300. When the voltage reference ($V_{dc}^*$) is input, the DC-Link voltage ($V_{dc}$) of the power conversion device 300 connected to the rotor 200 measured by a voltage sensor is used as a feedback signal. In the proposed system, the input power to the DC-Link is the same as a minus value of the rotor power ($P_r$). From FIG. 8, it is possible to confirm that the power flow output from the DC-Link is present only as the rotor power. In this case, when the power input to the DC-Link is $P_{dc}$ and the sign is set reversely to the rotor power ($P_r$), Equation 19 is satisfied.

$$P_r = -V_{dc}I_{dc} = -V_{dc}C_{dc}\frac{dV_{dc}}{dt} = -P_{dc} \quad \text{[Equation 19]}$$

$I_{dc}$ represents a current value entering the DC-Link, and $C_{dc}$ represents a size of the DC-Link capacitor. From Equation 19, it is possible to confirm the relationship between the DC-Link voltage ($V_{dc}$) and the rotor power ($P_r$), and it is possible to control the DC-Link voltage ($V_{dc}$) by adjusting the rotor power ($P_r$).

The rotor power ($P_r$) is determined by the rotor voltage ($V_{dc}$) and the rotor current ($I^r_{dqr}$) in the equivalent circuits shown in FIG. 7a and FIG. 7b. The dq-axis voltages and currents of the positive phase sequence component and the negative phase sequence component are present, and the power is represented by multiplication of voltage and current. Accordingly, similarly to the torque, 4 kinds of rotor powers are present, and the rotor power ($P_r$) is the sum of the 4 kinds of rotor powers.

They are $P_{r,pp}$ based on the voltage of the positive phase sequence component and the current of the positive phase sequence component, $P_{r,pn}$ based on the voltage of the positive phase sequence component and the current of the negative phase sequence component, $P_{r,np}$ based on the current of the positive phase sequence component and the voltage of the negative phase sequence component, and $P_{r,nn}$ based on the voltage of the negative phase sequence component and the current of the negative phase sequence component.

As shown in Equation 20, $P_{r,pn}$ and $P_{r,np}$ are represented by multiplication of a constant and trigonometrical function, which becomes a ripple power component, and the active power becomes 0. Accordingly, there is no influence on the DC-Link voltage of the power conversion device connected to the rotor, and thus is not considered.

$$\begin{aligned}P_{r,pn} &= \frac{3}{2}(V^\omega_{dr,p}I^\omega_{dr,n} + V^\omega_{qr,p}I^\omega_{qr,n}) \\ &= \frac{3}{2}Re(V^\omega_{dqr,p}I^{\omega*}_{dqr,n}) \\ &= \frac{3}{2}Re\big(V^\omega_{dqr,p}(e^{-j2\theta_{grid}}I^n_{dqr,n})^*\big) \\ &= \frac{3}{2}(V^p_{dr,p}(I^n_{dr,n}\cos(2\theta_{grid}) + I^n_{qr,n}\sin(2\theta_{grid})) + \\ &\quad V^p_{qr,p}(-I^n_{dr,n}\sin(2\theta_{grid}) + I^n_{qr,n}\cos(2\theta_{grid}))) \end{aligned} \quad \text{[Equation 20]}$$

$$\begin{aligned}P_{r,np} &= \frac{3}{2}(V^\omega_{dr,n}I^\omega_{dr,p} + V^\omega_{qr,n}I^\omega_{qr,p}) \\ &= \frac{3}{2}(V^n_{dr,n}(I^p_{dr,p}\cos(2\theta_{grid}) - I^p_{qr,p}\sin(2\theta_{grid})) + \\ &\quad V^n_{qr,n}(I^p_{dr,p}\sin(2\theta_{grid}) + I^p_{qr,p}\cos(2\theta_{grid}))) \end{aligned}$$

$P_{r,pp}$ and $P_{r,nn}$ are represented as Equation 21, and have the active power.

$$\begin{aligned}P_{r,pp} &= \frac{3}{2}(V^\omega_{dr,p}I^\omega_{dr,p} + V^\omega_{qr,p}I^\omega_{qr,p}) = \\ &\quad \frac{3}{2}\Big(R_r I^{p2}_{dr,p} + R_r I^{p2}_{qr,p} + \frac{L_m}{L_s}(\omega_e - \omega_r)\lambda^p_{ds,p}I^p_{qr,p}\Big) \end{aligned} \quad \text{[Equation 21]}$$

$$\begin{aligned}P_{r,nn} &= \frac{3}{2}(V^\omega_{dr,n}I^\omega_{dr,n} + V^\omega_{qr,n}I^\omega_{qr,n}) = \\ &\quad \frac{3}{2}\Big(R_r I^{n2}_{dr,n} + R_r I^{n2}_{qr,n} + \frac{L_m}{L_s}(-\omega_e - \omega_r)\lambda^n_{ds,n}I^n_{qr,n}\Big) \end{aligned}$$

Accordingly, the rotor power ($P_r$) may be represented by the sum of $P_{r,pp}$ and $P_{r,nn}$ as Equation 22.

$$\begin{aligned}P_r &= P_{r,pp} + P_{r,nn} \\ &= \frac{3}{2}\Big(R_r I^{p2}_{dr,p} + R_r I^{p2}_{qr,p} + \frac{L_m}{L_s}(\omega_e - \omega_r)\lambda^p_{ds,p}I^p_{qr,p}\Big) + \\ &\quad \frac{3}{2}\Big(R_r I^{n2}_{dr,n} + R_r I^{n2}_{qr,n} + \frac{L_m}{L_s}(-\omega_e - \omega_r)\lambda^n_{ds,n}I^n_{qr,n}\Big) \end{aligned} \quad \text{[Equation 22]}$$

The current reference generator 440 generates magnetic flux current references ($I_{dr,p}^{p*}$ and $I_{dr,n}^{n*}$) of the positive phase sequence component and the negative phase sequence component on the basis of the reactive power reference ($Q_s^*$) of the stator coil generated in the reactive power reference generator 410. In addition, it generates torque current references ($I_{qr,p}^{p*}$ and $I_{qr,n}^{n*}$) of the positive phase sequence component and the negative phase sequence component on the basis of the torque reference ($T_e^*$) or the generated rotor power reference ($P_r^*$).

The current controller 450 generates a voltage reference ($v_{dqr}^{r*}$) on the basis of the generated rotor current references ($I_{dr,p}^{p*}$, $I_{dr,n}^{n*}$, $I_{qr,p}^{p*}$ and $I_{qr,n}^{n*}$) the DC-Link voltage ($V_{dc}$), and the measured rotor current ($I_{dqr}^r$). The power conversion device 300 applies a voltage to the rotor to control the rotor current on the basis of the generated voltage reference ($V_{dqr}^{r*}$). The rotor current references ($I_{dr,p}^{p*}$, $I_{dr,n}^{n*}$, $I_{qr,p}^{p*}$ and $I_{qr,n}^{n*}$) are determined by the reactive power reference ($Q_s^*$) of the coil of the rotor 100 determined by the reactive power reference generator, the torque reference ($T_e^*$) generated by the velocity controller 430, and the rotor power reference ($P_r^*$) for controlling the DC-Link voltage ($V_{dc}$) of the power conversion device 300 connected to the rotor.

Accordingly, when the reference ($Q_s^*$) of the stator reactive power is given using Equation 16, it is possible to generate the sum ($I_{dr,p}^{p*}$ and $I_{dr,n}^{n*}$) of the d-axis current references of the positive phase sequence component and the negative phase sequence component of the rotor current. As shown in Equation 23, it is possible to set a function of generating the d-axis current reference of the rotor positive phase sequence component and negative phase sequence components from the stator reactive power reference. In addition, it is possible to set a function of calculating PF from the measured rotor current as shown in Equation 24.

$$(I_{dqr,p}^{p*}, I_{dr,n}^{n*}) = f_d(Q_s^*)$$ [Equation 23]

$$PF = f_{PQ}(I_{dqr}^{r})$$ [Equation 24]

When the rotor power reference ($P_r^*$) and the torque reference ($T_e^*$) of the output of the velocity controller and the voltage controller are given and the d-axis current references of the rotor positive phase sequence component and negative phase sequence component are generated in Equation 23, it is possible to set a function of generating the q-axis references of the rotor positive phase sequence component and negative phase sequence components on the basis of Equation 11 and Equation 22 under the presumption that the current reference value is sufficiently controlled by the current control.

$$(I_{qr,p}^{p*}, I_{nqr,n}^{n*}) = f_q(P_r^*, T_e^*, I_{qr,p}^{p*}, I_{dr,n}^{n*})$$ [Equation 25]

Figure 10:
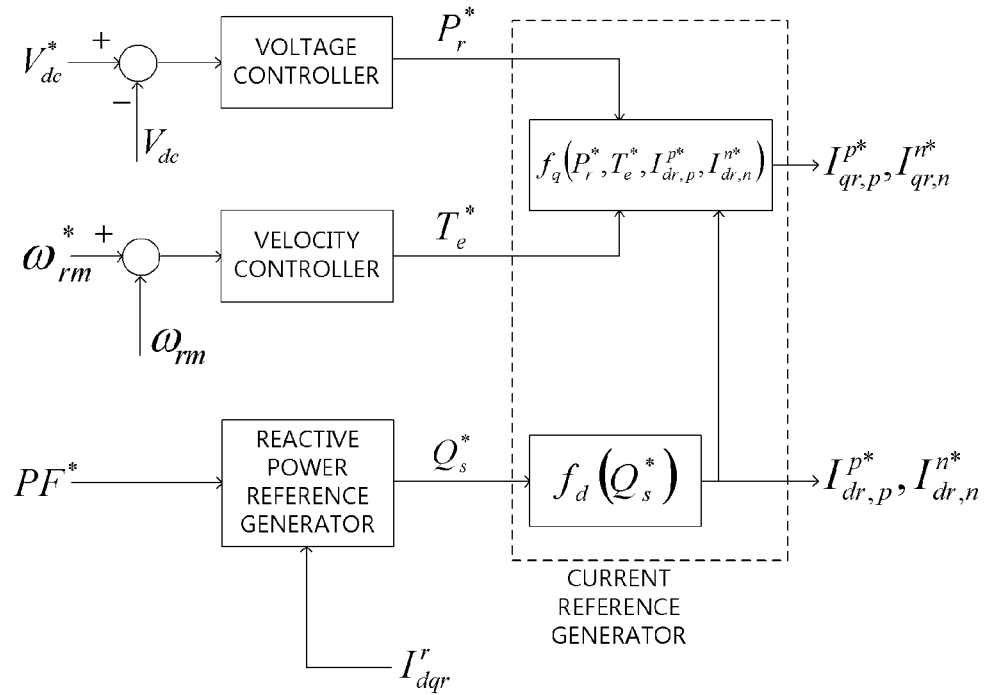
FIG. 10 is a diagram illustrating an internal structure of a voltage controller, a velocity controller, a reactive power reference generator, and a current reference generator according to an embodiment of the disclosure.

FIG. 10 is a diagram illustrating an internal structure of the voltage controller 420, the velocity controller 430, the reactive power reference generator 410, and the current reference generator 440 according to an embodiment of the disclosure. The voltage controller 420 and the velocity controller 430 receive the DC-Link voltage measured by the voltage sensor and the mechanical angular velocity measured by the encoder, compare them with the reference values, and set a controller which may apply all of the P controller, the PI controller, the PID controller, and the like. In the embodiment, the PI controller is applied. The reactive power reference generator 410 calculates the power factor of the stator and generates the reactive power reference of the stator, using Equation 24 from the measured rotor current. The stator reactive power reference ($Q_s^*$) of the reactive power reference generator 410 is applied to Equation 23 to generate the d-axis current references ($I_{dr,p}^{p*}$ and $I_{dr,n}^{n*}$) of the rotor positive phase sequence component and negative phase sequence components. In addition, the d-axis current references of the generated rotor positive phase sequence component and negative phase sequence components and the outputs of the voltage controller and the velocity controller are applied to Equation 25 to generate the q-axis current reference of the rotor positive phase sequence component and negative phase sequence component. In this case, all of the reactive power reference generator 410, the velocity controller 430, and the voltage controller 420 are independently operated. That is, the outputs of the reactive power reference generator 410, the velocity controller 430, and the voltage controller 420 do not have an influence on each other.

Applying not the positive and negative sequence coordinate system but the stationary coordinate system, the system in the disclosure can be controlled. The torque can be controlled by the q-axis rotor current in the stationary coordinate system. The rotor power and the reactive power can be controlled by the d-axis rotor current in the stationary coordinate system.

Figure 11:
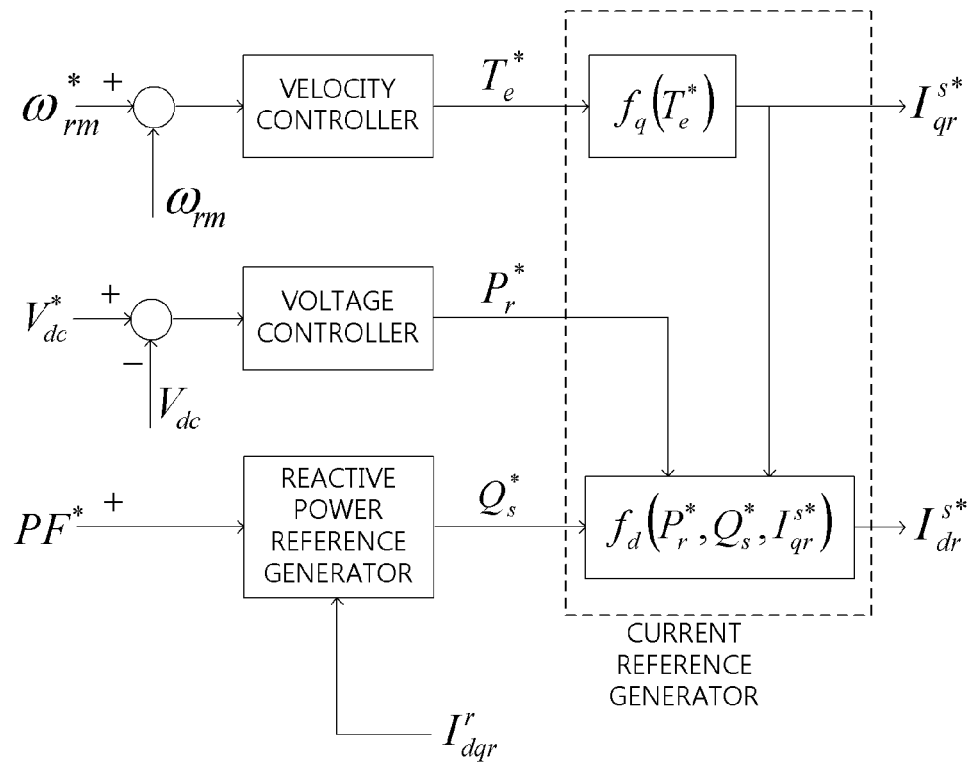
FIG. 11 is a diagram illustrating an internal structure of the velocity controller 430, the voltage controller 420, the reactive power reference generator 410, and the current reference generator 440 according to an embodiment of the disclosure applying the stationary coordinate system.

FIG. 11 is a diagram illustrating an internal structure of the velocity controller 430, the voltage controller 420, the reactive power reference generator 410, and the current reference generator 440 according to an embodiment of the disclosure applying the stationary coordinate system. In the same manner as FIG. 10, the velocity controller 430, the voltage controller 420, and the reactive power reference generator 410 generate the references of the torque, the rotor power, and the reactive power. The torque reference generates the q-axis rotor current in the stationary coordinate system ($I_{qr}^{s*}$). The references of the rotor power and the reactive power generate the d-axis rotor current in the stationary coordinate system ($I_{dr}^{s*}$).

The disclosure has been described above by the specific items such as the specific constituent elements and limitative embodiments and drawings, but they are provided merely to more easily understand the disclosure, the disclosure is not limited thereto, and a person skilled in the art may variously amend and modify them from such a base.

Accordingly, the disclosure should not be limited to the embodiments described above, and everything modified uniformly or equivalently with claims belongs to the scope of the disclosure, as well as claims to be described later.

INDUSTRIAL APPLICABILITY

According to the aspect of the disclosure, an effect capable of removing a separate circuit for initial moving of a single phase wound rotor type motor is achieved.

In addition, an effect capable of driving the single phase wound rotor motor in all the velocity sections in the rated current is achieved.

In addition, an effect capable of minimizing a power conversion circuit in a driving system of the single phase wound rotor type motor is achieved.

In addition, an effect of smoothing the variable velocity control is achieved although the single phase wound rotor type motor is directly connected to the system power supply.

In addition, an effect capable of lowering a harmonic rate of various system power supplies including three phases is achieved.

In addition, an effect capable of adjusting a power factor of a power supply connected to a wound rotor type induction motor is achieved.

The invention claimed is:

1. A wound rotor type motor comprising:
 a stator in which a coil directly connected to a single phase grid power supply or a direct current power supply is wound;
 a rotor that is rotatably supported in the stator;
 a power conversion device that is connected to the rotor and controls a rotor current; and
 a control circuit that is connected to the power conversion device and controls the power conversion device.

2. The wound rotor type motor according to claim 1, wherein the power conversion device is attached on a surface of the rotor.

3. The wound rotor type motor according to claim 1, wherein the power conversion device is connected to a load, and an insulating form voltage is transmitted to the load.

4. The wound rotor type motor according to claim 1, wherein the control circuit models and controls the single phase grid power supply or direct current power supply into a positive phase sequence component and negative phase sequence component 3-phase voltage.

5. The wound rotor type motor according to claim 4, wherein the control circuit includes:
- a velocity controller that generates a torque instruction necessary to drive the wound rotor type motor;
- a voltage controller that generates a power instruction of the rotor;
- a current instruction generator that generates a rotor current instruction on the basis of the generated power instruction of the rotor; and
- a current controller that generates a voltage instruction on the basis of the generated rotor current instruction, a DC-Link voltage of the power conversion device, or the rotor current,
- wherein the power conversion device applies a voltage to the rotor on the basis of the generated voltage instruction to control the rotor current.

6. The wound rotor type motor according to claim 5, wherein the control circuit further includes a velocity controller that generates a torque instruction necessary to drive the wound rotor type motor,
- wherein the current controller generates the rotor current instruction on the basis of the generated power instruction of the rotor or the generated torque instruction.

7. The wound rotor type motor according to claim 6, wherein the control circuit further includes a power factor controller that generates an ineffective power instruction of a stator,
- wherein the current controller generates the rotor current instruction on the basis of the generated power instruction of the rotor, the generated torque instruction, or the ineffective power instruction of the stator.

8. The wound rotor type motor according to claim 6, wherein the velocity controller generates the torque instruction on the basis of a mechanical angular velocity of the rotor.

9. The wound rotor type motor according to claim 7, wherein the power factor controller generates the ineffective power instruction of the stator on the basis of the rotor current.

10. The wound rotor type motor according to claim 7, wherein the rotor current instruction includes a d-axis current instruction and a q-axis current instruction, and
- wherein the current instruction generator generates the d-axis current instruction on the basis of the generated ineffective power instruction.

11. The wound rotor type motor according to claim 10, wherein the current instruction generator generates the q-axis current instruction on the basis of the generated power instruction of the rotor and the d-axis current instruction.

12. The wound rotor type motor according to claim 10, wherein the current instruction generator generates the q-axis current instruction on the basis of the generated torque instruction and the d-axis current instruction.

13. The wound rotor type motor according to claim 10, wherein the current instruction generator generates the q-axis current instruction on the basis of the generated power instruction of the rotor, the generated torque instruction, and the d-axis current instruction.

14. The wound rotor type motor according to claim 1, wherein the control circuit includes:
- a velocity controller that generates a torque instruction necessary to drive the wound rotor type motor;
- a voltage controller that generates a power instruction of the rotor;
- a power factor controller that generates an ineffective power instruction of a stator;
- a current instruction generator that generates a rotor current instruction on the basis of the generated power instruction of the rotor; and
- a current controller that generates a voltage instruction on the basis of the generated rotor current instruction, a DC-Link voltage of the power conversion device, or the rotor current,
- wherein the power conversion device applies a voltage to the rotor on the basis of the generated voltage instruction to control the rotor current,
- wherein the rotor current instruction includes a d-axis current instruction and a q-axis current instruction based on the stationary coordinate system,
- wherein the current instruction generator generates the q-axis current instruction on the basis of the torque instruction and generates the d-axis current instruction on the basis of at least one of the ineffective power instruction of the stator and the power instruction of the rotor.

15. The wound rotor type motor according to claim 1, further comprising a contactor that is attached to a rotor shaft to allow a current to flow in the rotor from the outside, wherein the power conversion device is connected to the rotor through the contactor on the outside of the rotor.

16. A control method of a wound rotor type motor comprising:
- generating a torque instruction necessary to drive the wound rotor type motor including a stator in which a coil directly connected to a single phase grid power supply or a direct current power supply is wound, a rotor that is rotatably supported in the stator, a power conversion device that is attached to the rotor and controls a rotor current, and a control circuit that is connected to the power conversion device and controls the power conversion device;
- generating a power instruction of the rotor;
- generating a rotor current instruction on the basis of the generated power instruction of the rotor; and
- generating a voltage instruction on the basis of the generated rotor current instruction, a DC-Link voltage of the power conversion device, or the rotor current,
- wherein the power conversion device applies a voltage to the rotor on the basis of the generated power instruction to control the rotor current.

17. The control method of a wound rotor type motor according to claim 16, further comprising generating a torque instruction necessary to drive the wound rotor type motor,
- wherein said generating of the rotor current instruction further includes generating the rotor current instruction on the basis of the generated power instruction of the rotor or the generated torque instruction.

18. The control method of a wound rotor type motor according to claim 17, further comprising generating an ineffective power instruction of the stator,
- wherein said generating of the rotor current instruction further includes generating the rotor current instruction on the basis of the generated power instruction of the rotor, the generated torque instruction, or the ineffective power instruction of the stator.

19. The control method of a wound rotor type motor according to claim 18, wherein the rotor current instruction includes a d-axis current instruction and a q-axis current instruction, and
- wherein said generating of the rotor current instruction further includes generating the d-axis current instruction on the basis of the generated ineffective power instruction.

20. The control method of a wound rotor type motor according to claim 19, wherein said generating of the rotor current instruction further includes generating the q-axis current instruction on the basis of the generated power instruction of the rotor, the generated torque instruction, and the d-axis current instruction.

* * * * *